(12) United States Patent
Pierre et al.

(10) Patent No.: US 9,110,977 B1
(45) Date of Patent: Aug. 18, 2015

(54) AUTONOMOUS REAL TIME PUBLISHING

(75) Inventors: John M. Pierre, Pacifica, CA (US);
James Hankle, San Francisco, CA (US);
Mark Butler, Moraga, CA (US); John Hell Wig, Penn Valley, CA (US)

(73) Assignee: Linguastat, Inc., San Francisco, CA (US)

( * ) Notice: Subject to any disclaimer, the term of this patent is extended or adjusted under 35 U.S.C. 154(b) by 212 days.

(21) Appl. No.: 13/020,672

(22) Filed: Feb. 3, 2011

(51) Int. Cl.
*G06F 17/30* (2006.01)

(52) U.S. Cl.
CPC .............................. *G06F 17/30663* (2013.01)

(58) Field of Classification Search
CPC ................................................ G06F 17/30663
USPC ......................................... 707/722, 765, 767
See application file for complete search history.

(56) References Cited

U.S. PATENT DOCUMENTS

| | | | | |
|---|---|---|---|---|
| 6,161,102 | A  * | 12/2000 | Yanagihara et al. | ............... 707/3 |
| 8,055,669 | B1 * | 11/2011 | Singhal et al. | ............... 707/765 |
| 2005/0131884 | A1 * | 6/2005 | Gross et al. | ....................... 707/3 |
| 2006/0161543 | A1 * | 7/2006 | Feng et al. | ......................... 707/5 |
| 2009/0106203 | A1 * | 4/2009 | Shi et al. | ............................. 707/3 |
| 2010/0198857 | A1 * | 8/2010 | Metzler et al. | ................ 707/768 |
| 2011/0145352 | A1 * | 6/2011 | Malik | ............................ 709/206 |
| 2012/0078895 | A1 * | 3/2012 | Chu-Carroll et al. | ......... 707/728 |
| 2012/0167010 | A1 * | 6/2012 | Campbell et al. | .............. 715/825 |

* cited by examiner

*Primary Examiner* — Khanh Pham
(74) *Attorney, Agent, or Firm* — Hickman Palermo Becker Bingham LLP

(57) ABSTRACT

Techniques for autonomous and automatic real-time publishing of content are described. In an example embodiment, one or more topic terms are obtained. A set of information that is related to the one or more topic terms is automatically acquired. Linguistic analysis on the set of information is automatically performed to determine a set of linguistic structures that are represented in the set of information. The set of linguistic structures is used to automatically create a set of content items that are responsive to searches that include the one or more topic terms. New content that includes the set of content items is then automatically published.

26 Claims, 9 Drawing Sheets

AUTONOMOUS REAL TIME PUBLISHING

TECHNICAL FIELD

The present invention relates to creating and publishing content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users typically search for web content by using a search engine such as Yahoo or Bing. A search engine is typically configured to continuously browse and index web pages and other web resources that are available online, and to provide an interface that can be used to search the indexed information in response to keywords and other search terms or phrases that are entered by a user in the search engine interface. Typically, a search engine performs the tasks of finding web pages (also commonly referred to as "crawling"), building a search index that supports efficient querying of the content of the crawled web pages, and using the search index to find and return links to web pages that include the keywords and search terms that are entered by a user in the search engine interface.

Web users are becoming more sophisticated in the way they search for information. For example, when searching for very specific information, users typically enter search queries that may include numerous keywords and even entire sentences or paragraphs. In response to such a "long-tail query", search engines typically return links to thousands and thousands of web pages, and it is up to the user to click on links to large numbers of web pages until the user finds the very specific information she is looking for. The main reason for this less-than optimal response to a long-tail query is that web pages that include all of the terms in the long-tail query often do not exist online and thus are not crawled and indexed by the search engine. Also, for web pages that do contain all the terms of the long-tail query, the content on these pages may not actually be about all the terms of the query.

One approach to provide web content responsive to long-tail queries is to use social networks or groups of part-time human contributors that manually create web content for specific topics. For example, a human contributor may be tasked with writing a web article specifically about inexpensive hotels that are available in the various neighborhoods of New York City. After the human contributor writes the web article, the web article would typically be posted on a website so that it would be crawled and indexed by a search engine.

This human-based approach to providing web content responsive to long-tail queries has many disadvantages principally including cost. Another disadvantage of this human-based approach is that it is time consuming because it may take the human contributor hours or even days to collect the relevant information and to write a web article. Another disadvantage is that this human-based approach cannot possibly produce web content in real time for thousands and thousands of niche topics that may spring up daily and even hourly from the vast quantities of news, events, and other information that is constantly published online. Another disadvantage of this human-based approach is that often a web article created by a human contributor would not be complete or entirely accurate. This is because the human contributor would not be able to collect within a reasonable time frame enough information that is accurate and completely responsive to the topic addressed in the web article. Yet another disadvantage of this human-based approach is that it is difficult or impossible for human editors to refresh or update millions of web pages every time new information becomes available.

BRIEF DESCRIPTION OF THE DRAWINGS

The techniques described herein are illustrated by way of example, and not by way of limitation, in the figures of the accompanying drawings and in which like reference numerals refer to similar elements and in which.

DETAILED DESCRIPTION

Figure 1:
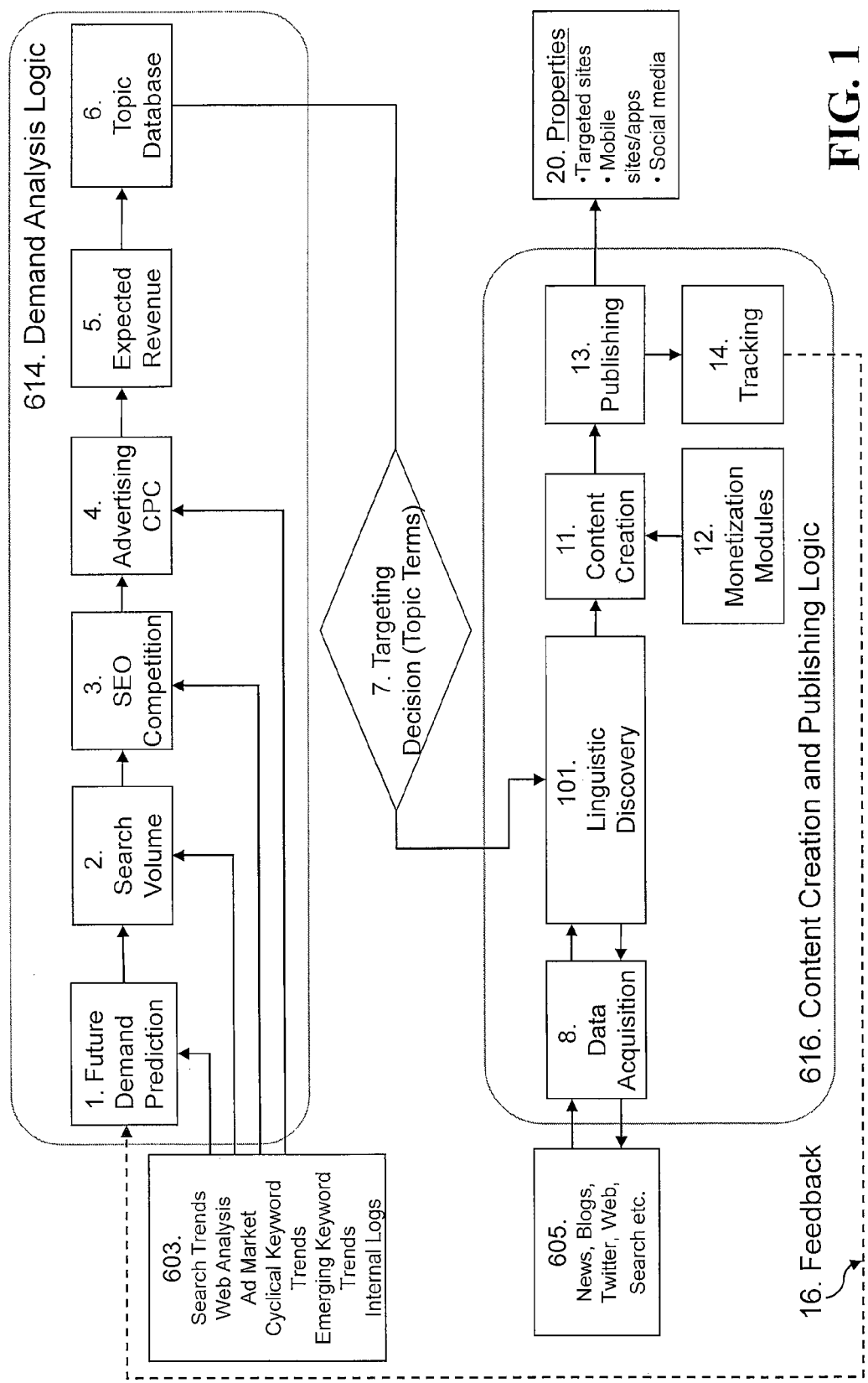
FIG. 1 that illustrates an example technique for autonomous real-time publishing according to one embodiment.

In the following description, for the purposes of explanation, numerous specific details are set forth in order to provide a thorough understanding of the techniques for autonomous real-time publishing. It will be apparent, however, that the techniques described herein may be practiced without these specific details. In other instances, well-known structures and devices are shown in block diagram form in order to avoid unnecessarily obscuring the techniques described herein.

GENERAL OVERVIEW

Techniques for autonomous and automatic real-time publishing of web content are described herein. Embodiments of these techniques in online systems, application servers, and the like, are able to run completely autonomously and automatically to perform tasks that include, but are not limited to:

monitor trends in news, blogs, Twitter, websites, social networks, search behavior, advertising rates, and other external and/or internal signals to find optimal target topics;

query and crawl internet resources to find content source materials for the target topics;

linguistically analyze the source materials to find linguistic patterns of interest related to the target topics;

expand the linguistic patterns of interest utilizing semantic queries;

utilize linguistic structures corresponding to the linguistic patterns of interest to plan, create, and assemble new unique content blocks of content items, including text, multimedia, and advertising, that are relevant and responsive to the target topics;

publish web pages with the created content blocks to web sites, mobile applications, social media, and/or other distribution channels.

Example embodiments of the techniques described herein may run autonomously and automatically within a cloud computing framework. These embodiments may be configured to find and create quality content for a much wider range of target search topics (ultimately billions) than would be possible with human-based approaches. Thus, the techniques described herein are able to address, in real or near real-time, a much larger segment of the long-tail query search market and to produce landing web pages and other web content that rank well in search engine results and are responsive and more relevant to web searches performed by users. Since the techniques described herein autonomously and automatically produce web pages that are highly relevant and responsive to long-tail queries, which tend to be highly specific with multiple keywords, any contextual advertising that is displayed on or associated with these web pages can also be more relevant to the information sought by the users, thereby leading to significant monetization opportunities.

In an example embodiment, the techniques described herein comprise a method that is performed by one or more computing devices, where the method comprises the computer-implemented steps of: obtaining one or more topic terms; automatically acquiring a set of information that is related to the one or more topic terms; automatically performing linguistic analysis on the set of information to determine a set of linguistic structures that are represented in the set of information; automatically expanding the set of linguistic structures utilizing semantic queries; automatically using the set of linguistic structures to create a set of content items that are responsive to searches that include the one or more topic terms; automatically generating one or more web pages that include the set of content items; and publishing the one or more web pages in one or more online domains.

In other embodiments, the techniques described herein may comprise a system, apparatus, and computer-readable storage media storing sequences of executable instructions.

Automatic Demand Analysis

The techniques for autonomous real-time publishing described herein provide for automatically performing demand analysis to monitor disparate sources of information in order to find search topics with an optimal combination of high search volume, low competition of existing relevant web resources and content, and high advertising Cost-Per-Click ("CPC") rates for target topic terms. As used herein, "topic term" refers to one or more words, phrases, keywords, or any other structured or unstructured portions of text that can be used by a user to search for information on a given topic. As used herein, "automatic" and "automatically" means that the referenced functionality is performed by a computing device without receiving direct input from a user and not in response to user input, and "autonomous" and "autonomously" means that the referenced functionality is performed by the computing device without being controlled by a human person.

FIG. 1 illustrates autonomous and automatic real-time publishing according to an example embodiment of the techniques described herein. The example embodiment illustrated in FIG. 1 includes demand analysis logic 614 and content creation and publishing logic 616. As used herein, "logic" refers to a set of instructions which, when executed by one or more processors, are operable to perform one or more functionalities. In various embodiments and implementations, any such logic may be implemented as one or more software components that are executable by one or more processors or as any combination of one or more software and hardware components such as Application-Specific Integrated Circuits (ASICs). For example, any particular logic may be implemented, without limitation, as one or more software modules, as one or more libraries of functions, as one or more dynamically linked libraries, as a standalone or client-server software application, and as one or more application servers and/or components thereof.

In the example embodiment of FIG. 1, demand analysis logic 614 is configured to monitor disparate sources of information to find search topics which are undersupplied with content in one or more online domains. Based on automatic and autonomous analysis of information retrieved from the disparate sources, demand analysis logic 614 is configured to generate one or more target topic terms for which web content is to be automatically created and published by content creation and publishing logic 616.

Among other components, demand analysis logic 614 comprises future demand prediction module 1 and expected revenue module 5. Future demand prediction module 1 is logic configured to monitor and retrieve information from a set of disparate data sources 603 that may include, without limitation:

published search trends from search engines, internet service providers, and web tracking services;

internal web traffic logs and search query logs;

statistically significant emerging trends/frequencies of new keywords and concepts (e.g. such as people or events mentioned in breaking news) that are found via text data mining of news, blogs, and social media streams;

statistically significant cyclical trends/frequencies of known keywords and concepts found via text data mining of historical time stamped data sources (e.g., such as prevalence of keywords related to yearly holidays which will occur at known times in the future, for example, like topic terms such as "Halloween party in Manhattan", "witches", and "candy on sale" which are very likely to be used in web searches around late October).

From data sources 603, future demand prediction module 1 receives search volume information 2 for various search queries, that is time stamped with particular times or time periods, search engine optimization (SEO) competition information 3 that reflects how much content is available via search engines for various search queries, and advertising CPC information 4 that reflects per-click advertising rates for certain search queries. Future demand prediction module 1 then merges the SEO competition information 3 and advertising CPC information 4 with search volume information 2 at multiple timestamps, and generates time series data sets for statistical stochastic modeling for prediction and forecasting. The output from future demand prediction module 1 is a set of candidate topic terms and a probability distribution of search volumes over time intervals for each topic associated with the candidate topic terms, and associated expectation values for search volumes for a given topic in a given time interval. For example, the probability distribution of a candidate topic term may expressed as:

$P_{future}$(topic term, search_volume, start_time, stop_time)

where "search_volume" indicates the forecasted volume of searches that include the specified "topic term" over a time period indicted by the values of "start_time" and "stop_time".

The output from future demand prediction module 1 is passed to expected revenue module 5. Expected revenue module 5 is logic configured to combine the probability distributions derived from search volumes, the SEO competition information, and the advertising CPC information into a single joint conditional probability model that predicts expected revenue given a candidate search query (e.g., such as a long-tail query including given topic terms) and a time frame. Using the combination of joint conditional probability models for various search queries, expected revenue module 5 produces a probability distribution for estimated and/or expected number of clicks to a web page (click through rate from a search engine to a web page) for a given set of topic terms. Using the combination of probability distributions of number of clicks to a web page that has one or more sets of topic terms, the likelihood of clicking on an advertisement on the page, and the advertising rates per click, the expected revenue module 5 produces as output a probability distribution for expected revenue for the one or more sets of topic terms.

Demand analysis logic 614 then uses the output from expected revenue module 5 to build topic database 6, which stores various topic terms and information representing expected revenue values for each topic term. Based on the information stored in topic database 6, demand analysis logic 614 makes decisions about one or more of: which topics are undersupplied with content in which online domains and therefore can be profitably targeted, when such content needs to be created and published, and in what manner to create content that will be most relevant and economical to address the information needs of the targeted market. Based on these decisions, demand analysis logic 614 determines one or more topic terms 7 for which content is automatically created and published by content creation and publishing logic 616. For example, demand analysis logic 614 may search through the topic terms and the corresponding expected revenue information that are stored in topic database 6, and may select those topic terms for which there is a good demand but there is not enough web content that is published online.

In this manner, demand analysis logic 614 may use various and diverse data sources 603 to automatically determine what are the current search trends on the web, what people are searching on, what kinds of content is getting published online for certain kinds of keywords, and what advertising rates are being commanded for certain kinds of keywords. Demand analysis logic 614 builds topic database 6 that can store topic terms associated with millions, and potentially billions, of topics that are undersupplied with web content. Within topic database 6, the topic terms are scored and associated with expected business revenue, and based on this information demand analysis logic 614 makes a targeting decision about which subsets of topic terms are good candidates for which to autonomously create and publish web content.

For example, by using information from data sources such as search trends, demand analysis logic 614 may determine that the topic terms "All Inclusive Vacation Resorts" may be a good targeting decision because there is a search demand for the topic represented by these topic terms—e.g., there may be 10,000 searches per month, and the demand analysis logic may determine that this volume is above a certain threshold that is configured to indicate what is considered a high search volume. Then, by using SEO information available from search engine companies (e.g., Google, Yahoo, etc.) or by looking at SEO characteristics of a large sample of web pages, demand analysis logic 614 can determine how much competition there is for the above topic terms and how many websites and/or web pages are optimizing for those topic terms. By using advertising CPC information, demand analysis logic 614 can then determine if there is a demand for advertising—e.g., if various companies are trying to buy ads—on web pages having the above topic terms. Based on this information, demand analysis logic 614 (or a component thereof, such as expected revenue module 5) can generate a probabilistic model for expected revenue that can be used to score and rank the above topic terms and to store this information in topic database 6. Thereafter, demand analysis logic 614 can use the information in topic database 6 to determine that the above topic terms are a good candidate for which web content should be automatically created and published.

It should be noted that the techniques described above by which topic terms are chosen using demand analysis logic 614 is only one example embodiment. In an alternative embodiment, a set of topic terms may be directly entered into content creation and publishing logic 616 without any processing by demand analysis logic 614. For example, a list of product names that is obtained automatically from a catalog may be introduced directly to content creation and publishing logic 616 as the set of topic terms.

Autonomous and Automatic Content Creation

According to the techniques described herein, a content creation process takes as input one or more topic terms such as, for example, topic terms that express the information need of a human searcher, and creates new unique content to meet the information need of the searcher. In some embodiments, the output of the content creation process is a finished, formatted content product such as a web page, and in other embodiments the content creation process may also produce intermediate content products such as XML-formatted records or database records. For example, the input in the content creation process may be topic terms that include multiple keywords such as "inexpensive hotels London", alternative variants that express the same information need such as "London hotels cheap", or a natural language query such as "Where is a cheap hotel in London?". The output of the content creation process may be a web page that includes a map that maps a list of hotel names and addresses of cheap and inexpensive hotels in London that are responsive to the topic terms.

Referring to the example embodiment illustrated in FIG. 1, after being outputted from demand analysis logic 614, topic terms 7 are automatically passed to content creation and publishing logic 616. (In some embodiments, in addition and/or instead of topic terms 7, content creation and publishing logic 616 may be configured to receive through a user interface input that modifies the automatically determined topic terms 7 and/or supplies additional topic terms.) Content creation and publishing logic 616 comprises linguistic discovery module 101, data acquisition module 8, content creation module 11, monetization module 12, publishing module 13, and tracking module 14.

Linguistic discovery module 101 is logic configured to receive topic terms 7, to generate search queries that are used by data acquisition module 8 to retrieve a set of information about and/or related to the topic terms, to perform linguistic analysis on the retrieved set of topic-related information, and to generate a set of linguistic structures that are represented in the retrieved set of topic-related information. As used herein, "linguistic structure" refers to a data structure that stores a data element and one or more identifiers that respectively identify one or more linguistic properties that are associated with the data element. Linguistic discovery module 101 passes the generated set of linguistic structures to content creation module 11. In some embodiments, linguistic discovery module 101 may further include logic configured to expand the set of generated linguistic structures by utilizing the linguistic analysis of the retrieved set of topic-related information.

Data acquisition module 8 is logic that is configured to generate or receive search queries (e.g., from linguistic discovery module 101) and to execute the search queries against various data sources 605 in order to gather the set of topic-related information that is relevant to topic terms 7. For example, data acquisition module 8 may execute search queries against internet data sources 605 (which may include, without limitation, news sites, blogs, Twitter, social networks and various web sites in various online domains, etc.) and may retrieve therefrom information having various content types including, without limitation, text, tables, and pages, that is related to topic terms 7. Data acquisition module 8 may then return the retrieved topic-related information to linguistic discovery module 101. In some embodiments, the data acquisition module may be further configured to perform linguistic analysis and to generate linguistic structures from the retrieved topic-related information, and to store the generated linguistic structures in a linguistic database.

Content creation module 11 is logic configured to examine the set of linguistic structures received from linguistic discovery module 101 by using statistical classification models, heuristic rules, business rules, etc. Content creation module 11 determines whether and for what type of content to create one or more content blocks, each having one or more content items, in order to meet the information need expressed in topic terms 7. Content creation module 11 then sends subsets of the set of linguistic structures to modules (not shown in FIG. 1) that are configured to generate content blocks with content items having the selected types of content. The generated content blocks are then sent to publishing module 13.

In some embodiments, in deciding for what type of content to create content items, content creation module 11 may receive input information from one or more monetization modules 12. Monetization modules 12 are logic configured to determine what company or individual would be the best advertiser for a given set of topic terms (e.g., such as topic terms 7) and the content blocks and content items responsive thereto, and to provide revenue information that indicates the revenue potential of the given set of topic terms. Content creation module 11 some components thereof then use the revenue information to decide what types of content should be generated.

Publishing module 13 is logic configured to assemble the content blocks received from content creation module 11 into web pages and/or other appropriate forms and formats of content. For example, in some embodiments publishing module 13 may be configured to generate one or more markup language documents (e.g., such as HTML documents) that comprise one or more web pages. In addition, or instead of, depending on the target market or domain, publishing module 13 may generate content in other appropriate forms and formats such as, for example, Twitter feeds, questions/answers for online conversations, and various types of multimedia objects. Publishing module 13 then publishes the generated web pages and/or other forms of content in one or more target online domains. The published web pages and content may be configured for various media or distribution properties 20 including, without limitation, branded websites, mobile sites and applications and social media sites, in order to address the needs and characteristics of the target markets, audiences, or domains.

In some embodiments, publishing module 13 is also configured to generate information that is provided to tracking module 14. Tracking module 14 is logic configured to track user behavior and to determine what people are clicking on, what they like, etc., by using the information received from publishing module 13 as well as information received or retrieved from web sites on which the content generated by content creation and publishing logic 616 is posted. Tracking module 14 generates tracking information and provides the tracking information as feedback 16 to demand analysis logic 614. Future demand prediction module 1 uses the feedback tracking information to enhance the statistical modeling for demand prediction and forecasting for the various topics that are determined based on the information retrieved from data sources 603.

Data Acquisition and Building a Linguistic Database

Some embodiments may include a linguistic discovery module that is logic configured to perform linguistic analysis on topic-related information, which is retrieved from a variety of data sources and which may have a variety of content types and formats. In these embodiments, the linguistic discovery module (or a component thereof) is configured to generate linguistic structures from the retrieved topic-related information, and to store the generated linguistic structures in a linguistic database. For example, the linguistic discovery module may use topic terms to retrieve the topic-related information, where the topic terms may be provided by a user or may be outputted from another module such as demand analysis module. In another example, the linguistic discovery module may use topic terms that are provided to the linguistic discovery module over a period of time. In this manner, the linguistic discovery module may be configured to build and store into the linguistic database a large number of linguistic structures that represent a comprehensive dataset of information that is related to and describes a large number of topics.

As used herein, "linguistic structure" refers to a data structure that stores a data element and one or more identifiers that respectively identify one or more linguistic categories that are associated with the data element. The data element may be a single word or a phrase including several words, and any particular linguistic category identifier indicates a particular linguistic category which corresponds to the usage of the data element in the underlying portion of text from which the data element is extracted. It is noted that the techniques described herein are not limited to generating linguistic structures for data elements that belong to a particular natural language; rather, the techniques described herein may be used to generate linguistic structures for data elements that belong to various natural languages including, but not limited to, English, German, Italian, French, Portuguese, Dutch, Swedish, etc.

Figure 4A:
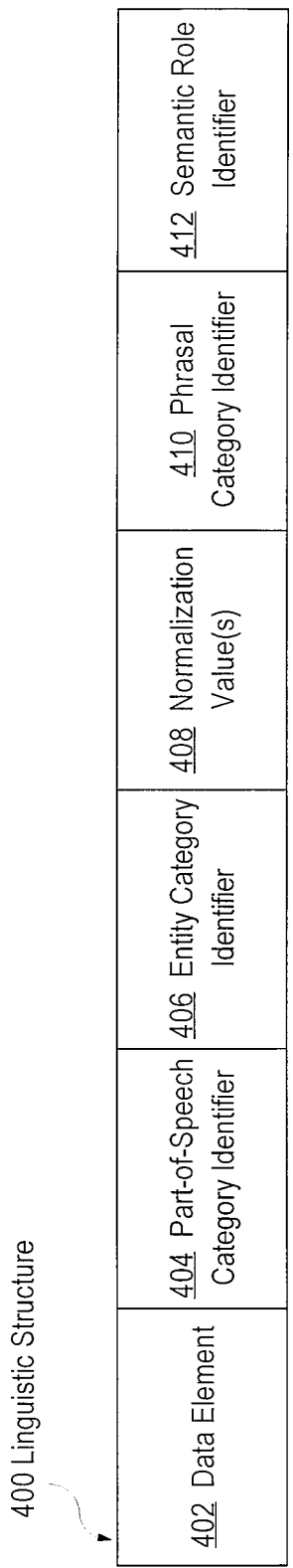
FIG. 4A illustrates an example linguistic structure according to one embodiment.

FIG. 4A illustrates a linguistic structure 400 according to an example embodiment. In this embodiment, a linguistic discovery module (or another component) may parse an underlying portion of text to extract a data element and to perform a linguistic analysis on the portion of text to determine the various linguistic categories with which the data element is associated. The linguistic discovery module stores in a linguistic structure the data element and the results of the linguistic analysis in the form of one or more linguistic category identifiers that are associated with the data element.

Linguistic structure 400 includes a data element field 402 and one or more category identifier fields 404-412. For illustration purposes, in FIG. 4A a single linguistic structure is shown to store a data element and multiple linguistic category identifiers associated with that data element; it is noted, however, that in various embodiments and implementations the same data element may be stored in multiple linguistic structures each having a single linguistic category identifier. It is also noted that in various embodiments and implementations, a linguistic structure may be implemented in various ways including, but not limited to, as an object that is instantiated from an object-oriented class having a set of class attributes, as a data record having a set of fields, as a length-type-value data structure, and as any other data structure that is suitable for storing multiple fields that are associated with each other.

Referring to FIG. 4A, data element field 402 is configured for storing a data element that is extracted from a portion of text such as, for example, a sentence, a phrase, a paragraph, etc.

Part-of-speech category identifier field 404 is configured for storing an identifier that identifies a part-of-speech linguistic category which corresponds to how the data element stored in field 402 is used in the portion of text from which the data element is extracted. Examples of part-of-speech linguistic categories include, but are not limited to, a proper name category, a verb group category, a determiner category, a noun category, a prepositional category, and a data context category.

Entity category identifier field 406 is configured for storing an identifier that identifies an entity linguistic category which corresponds to the type of entity that the data element stored in field 402 references in the portion of text from which the data element is extracted. Examples of entity linguistic categories include, but are not limited to, a person, a product, a material object, a location, a company, a place, a thing, and any other category or classification that may be used to describe real-world entities.

Normalization value(s) field 408 is configured for storing normalization values to which the data element stored in field 402 can be uniquely resolved. Normalization values may be used to resolve entities that may belong to several different entity categories. For example, words that represent numbers in the underlying portion of text can be resolved into one of a fixed set of number datatypes (e.g., such as "real", "integer", "float", etc.). In another example, words that represent dates in the underlying portion of text can be resolved into one of a fixed set of timestamps that represent various time periods. In another example, words that represent locations can be resolved into geo-spatial latitude-longitude coordinates.

Phrasal category identifier field 410 is configured for storing an identifier that identifies a phrasal linguistic category which corresponds to the phrase type, in the underlying portion of text, of the data element that is stored in field 402. Examples of phrasal linguistic categories include, but are not limited to, a noun phrase category, a verb phrase category, and a prepositional phrase category.

Semantic role identifier field 412 is configured for storing an identifier that identifies the semantic role of the data element stored in field 402 within the portion of text from which the data element is extracted. Examples of semantic roles include, but are not limited to a subject role, a predicate role, an object role, a temporal role, and a location role.

Figure 4B:
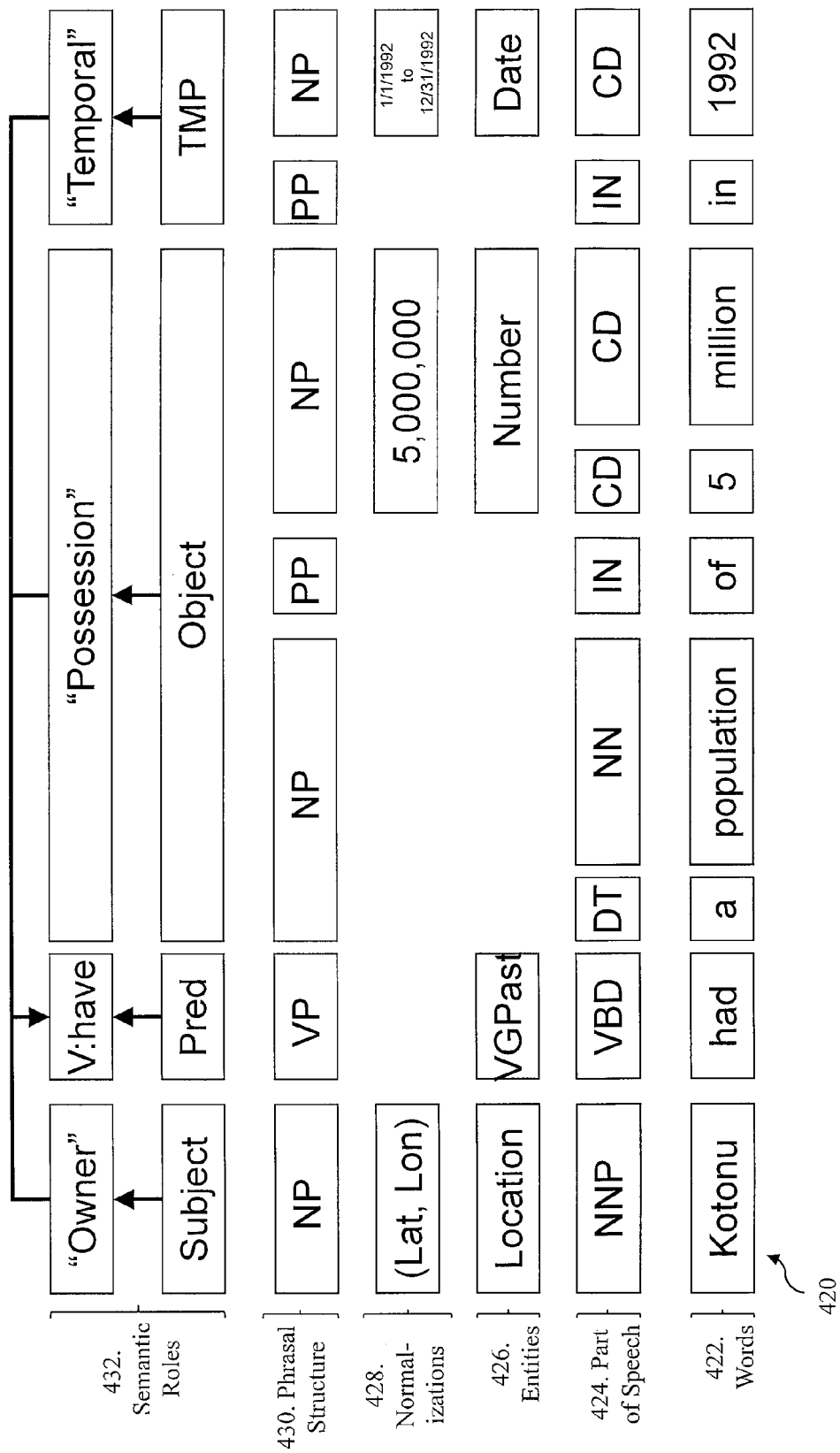
FIG. 4B illustrates an example generation of linguistic structures according to one embodiment.

FIG. 4B illustrates an example of generating linguistic structures from a portion of text. In this example, a linguistic discovery module (or another component) extracts from a data source the following sentence 420:

"Kotonu had a population of 5 million in 1992."
The linguistic discovery module parses sentence 420 into separate words 422, and generates one or more linguistic structures that store each of the words as data elements.

The linguistic discovery module (or another component) determines the part-of-speech categories 424 to which each of the words 422 belongs. For example, the linguistic discovery module determines that within sentence 420: the word "Kotonu" is a proper name (e.g., "NPP" part-of-speech category), the word "had" is a verb (e.g., "VBD" part-of-speech category), the word "a" is a determiner (e.g., "DT" part-of-speech category), the word "population" is a noun (e.g., "NN" part-of-speech category), the word "of" is a preposition (e.g., "IN" part-of-speech category), the words "5", "million", and "1992" are numbers (e.g., "CD" part-of-speech category), and the world "in" is another preposition. After determining the part-of-speech categories 424 to which each of words 422 belongs, the linguistic discovery module stores the respective part-of-speech linguistic category identifiers into the linguistic structures that store the corresponding words.

After tagging words 422 with part-of-speech category identifiers in this manner, the linguistic discovery module (or another component) determines the entity categories 426 to which the words belong. For example, the linguistic discovery module determines that: the word "Kotonu" references a location (e.g., "Location" entity category), the word "had" references a past event (e.g., "VGPast" entity category), the words "5" and "million" reference a number (e.g., "Number" entity category), and the word "1992" references a date (e.g., "Date" entity category). After determining the entity categories 426 to which each of words 422 belongs, the linguistic discovery module stores the respective entity category identifiers into the linguistic structures that store the corresponding words.

After tagging words 422 with entity category identifiers, the linguistic discovery module (or another component) determines the normalization values 428 to which the words can be uniquely resolved. For example, the linguistic discovery module determines that: the location entity having the word "Kotonu" can be normalized to a latitude/longitude spatial coordinates (e.g., a "(Lat, Lon)" value), the number entities having the words "5" and "million" can be normalized into an integer number value (e.g., "5,000,000"), and the date entity having the word "1992" can be normalized into a time period (e.g., "Jan. 1, 1992 to Dec. 31, 1992"). After determining the normalization values 428, the linguistic discovery module stores the respective normalization values into the linguistic structures that store the corresponding words.

After tagging words 422 with normalization values, the linguistic discovery module (or another component) determines the phrasal structure categories 430 to which the words or groups thereof belong. For example, the linguistic discovery module determines that: the word "Kotonu" is a noun phrase (e.g., "NP" phrasal category), the word "had" is a verb phrase (e.g., "VP" phrasal category), the group of words "a" and "population" is another noun phrase, the word "of" is a preposition phrase (e.g., "PP" phrasal category), the group of words "5" and "million" are another noun phrase, the word "in" is another preposition phrase, and the word "1992" is another noun phrase. After determining the phrasal structure categories 430 to which words 422 or groups thereof belong, the linguistic discovery module stores the respective phrasal structure identifiers into the linguistic structures that store the corresponding words.

After tagging words 422 with phrasal structure identifiers, the linguistic discovery module (or another component) determines the semantic roles 432 to which the words or groups thereof belong. To determine the semantic roles 432, the linguistic discovery module performs semantic analysis, which involves interpreting sets of phrases in terms of subjects, predicates, direct objects, indirect objects, temporal relationships, location relationships and determining some notion of the meaning of these sets of phrases. For example, the linguistic discovery module can perform semantic analysis on the underlying portions of text to recognize that an "owner" in the underlying sentence had/possessed "something" at a "certain time". In another example, the linguistic discovery module can determine whether certain relationships exist among the phrases in the underlying portions of text, and if so can compare these relationships to relationships in portions of text from other data sources.

Referring to the example illustrated in FIG. 4B, by performing semantic analysis on sentence 420, the linguistic discovery module can determine that: the word "Kotonu" has a "subject" or "owner" semantic role in sentence 420; the word "had" has a "predicate" semantic role in sentence 420, the group of words "a", "population, "of", "5", and "million" has an "object" or "possession" semantic role in sentence 420; and the group of words "in" and "1992" have a temporal semantic role in sentence 420. After determining the semantic roles 432 to which words 422 or groups thereof belong, the linguistic discovery module stores the respective semantic role identifiers into the linguistic structures that store the corresponding words. Further, based on the linguistic structures that store the data elements and the semantic role identifiers for sentence 420, the linguistic discovery module may determine that the "owner" ("Kotonu") is referenced in another sentence (possibly from a different data source), which lists a population of a different number that has a different date. Based on this determination, the linguistic discovery module may then associate sentence 420 with the other sentence by storing in the linguistic database one or more relationship identifiers between the linguistic structures derived from these two sentences.

It is noted, however, that in other embodiments and implementations, the linguistic structures may contain other identifiers corresponding to other features of the text, including without limitation, the source of the text, the author of the text, the publication date of the text, and so forth.

In this manner, linguistic structures can be generated from text that is retrieved from a large number of data sources. After being generated, some or all of the linguistic data structures, which are generated from information that is retrieved responsive to a set of topic terms, may be stored in a linguistic database.

Automatic Linguistic Discovery

Given one or more target topic terms, a linguistic discovery process performs multiple queries into a linguistic database via semantic queries using an iterative process. The linguistic database stores tagged and indexed representations of structured and unstructured data sources relevant to the target topic terms, where the data sources may include, but are not limited to, news articles, web pages, blog posts, social media comments, etc. The output from the linguistic discovery process is a set of relevant linguistic structures. The output linguistic structures include text information that is highly tagged with identifiers according to, without limitation, orthographic, lexical, syntactic, grammatical and semantic features and relationships. In some embodiments text information may be tagged for, without limitation, recognized entities such as geographic locations, persons, and organizations, and source metadata such as source name, author and publication date. The linguistic structures returned by the linguistic discovery process can describe many different facets of knowledge related to target topic terms including, but not limited to:
   which topic terms represent concepts, entities, persons, locations, products, organizations, dates, etc.;
   which topic terms represent verbs, modifiers, adjectives, or commands by the searcher;
   semantic relationships between the different topic terms in a multi-keyword search;
   other concepts, entities, persons, locations, products, organizations, dates, etc. related to one or more of the topic terms;
   other actions, verbs, modifiers, adjectives, or commands issued by typical searchers that are related to one or more of the topic terms;
   other events, questions, answers, facts, opinions, related to the topic terms;
   other locations and geospatial coordinates related to the topic terms;
   other dates, times, and timestamps related to the topic terms;
   relevance scores or other quantitative metrics related to the output linguistic structures.

Figure 2:
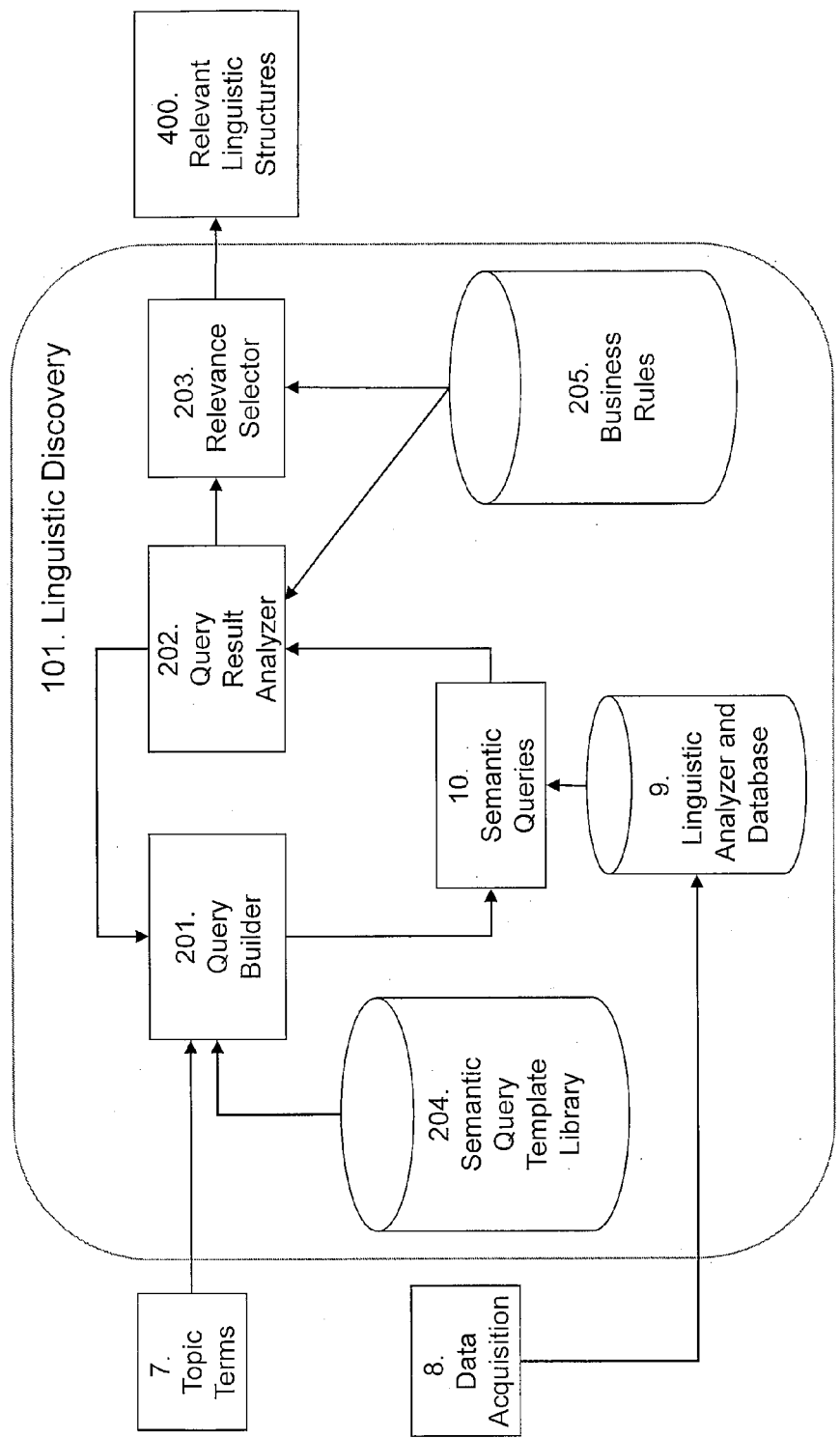
FIG. 2 illustrates an example linguistic discovery according to one embodiment.

FIG. 2 illustrates a linguistic discovery module according to an example embodiment. Linguistic discovery module 101 is logic configured to receive one or more topic terms 7, to receive, via data acquisition module 8, data from internet data sources 605 (which may include, without limitation, news sites, blogs, Twitter, social networks and various web sites in various online domains, etc.), and to turn the received topic terms into a set of linguistic structures 400 that conform to one or more sets of linguistic patterns and that represent knowledge and information in the data that is related to the received topic terms.

Query builder 201 is logic configured to receive topic terms 7 and to generate one or more semantic queries that can be used to search for information related to the topic terms. In the example embodiment of FIG. 2, query builder 201 retrieves one or more semantic query templates from semantic query template library 204, and creates one or more semantic queries 10 that include topic terms 7. As used herein, "semantic query" refers to a query that requests retrieval of information from one or more data sources without specifying any query terms or keywords that indicate how the requested information is represented, structured, and stored in the data sources. Unlike syntactic queries (e.g., like SQL and XQuery queries) that explicitly specify syntactic information that references structural elements of the underlying data source, a semantic query specifies retrieval of information without specifying syntactic information such as table names, column names, element names, and document/element hierarchical structures. An example of a semantic query is the natural language sentence
   "Retrieve hotels in London that offer room rates below $40".

Based on the semantic query templates, query builder 201 generates an initial set of semantic queries 10, where the semantic queries may request information retrievals that include, but are not limited to:
   find all sentences that contain all of the topic terms;
   find any locations, people, organizations that co-occur with the topic terms;
   find all sentences where the topic terms are in the "subject" and show the "verbs/predicates" and "direct objects" and "indirect objects" for those sentences;
   find all sentences where the topic terms are in the "object" and show the "verbs/predicates" and "subjects" for those sentences;
   find all topic keywords that are found in a "Locational" semantic role and show the "subjects", "verbs/predicates" and "direct objects" and "indirect objects" for those sentences.

It is noted that in some embodiments, the semantic queries may request information retrievals based on blocks of text that are not sentences, including without limitation, titles of videos, pictures and documents, 140-character social "Tweets" from Twitter, paragraphs, entire documents, or sets of documents.

The initial set of semantic queries 10 are executed against the database in linguistic analyzer and database 9. In some embodiments, a linguistic discovery module may populate the linguistic database with information that is retrieved from a variety of data sources; in these embodiments, the linguistic discovery module may use topic terms that are inputted into the linguistic discovery process over a period of time in order to build and store into the linguistic database a comprehensive dataset of information that is related to and describes a large number of topics.

When executed against the database in linguistic analyzer and database 9, the initial set of semantic queries 10 returns a set of results comprised of linguistic structures that match the semantic queries. Query result analyzer 202 is logic configured to examine the returned linguistic structures and to determine whether the returned linguistic structures represent information that is of sufficient quality and quantity to be responsive to topic terms 7. Based on its examination of the returned linguistic structures, query result analyzer 202 may send a request to query builder 201 to create an additional and/or a modified set of semantic queries 10 which may be more precise, may request different kinds of information relationships, or may further breakdown certain concepts. Some examples of criteria, which are used by query result analyzer 202 to make its decisions include, without limitation:

- if a location with geo spatial coordinates was found in the results returned from the initial set of semantic queries, find linguistic structures where the same "verb/predicate/action" has occurred within a specified distance radius;
- if a person's name was found in the results returned from the initial set of semantic queries, find the names of other people that appear as "direct objects" along with the associated "verb/predicate/action";
- if the topic terms did not occur together in any linguistic structure, create a new semantic query that looks for some of the topic terms together in a linguistic structure and other terms and keywords in another related linguistic structure, where the relation can be by proximity (such as nearby sentences) or based on a typed relation (e.g., semantic, co-reference, discourse, etc.).

This process of generating semantic queries 10, analyzing the results returned therefrom, and requesting a modified set of semantic queries to be generated and executed, can continue in an iterative loop until query result analyzer 202 determines that a sufficient set of linguistic structures, in terms of quality and/or quantity, has been gathered for topic terms 7. Said process serves to expand the number of linguistic structures produced by linguistic discovery module 101 for any given topic terms. In response to such determination, query result analyzer 202 passes the gathered set of linguistic structures to relevance selector module 203.

Relevance selector module 203 is logic configured to select, from the gathered set of linguistic structures, those linguistic structures 400 that are most relevant to topic terms 7. In the embodiment illustrated in FIG. 2, relevance selector module 203 is driven off business rules 205. Business rules 205 may include various configurable parameters that can be used by query result analyzer 202 and relevance selector module 203 such as, for example, parameters that specify a maximum number of semantic query iterations that can be performed, parameters that specify threshold values for determining relevance, etc. Business rules 205 may also store information that indicates business policies defining conditions which need to be met by the properties (e.g., timestamps, linguistic identifiers, etc.) of linguistic structures in order for the linguistic structures to be considered relevant, as well as conditions which can be used for assigning scores and determining relevance of the linguistic structures. Examples of such business policy conditions include, but are not limited to:

- whether topic terms appear together in certain semantic roles ("subject", "object", etc.) that are indicated in the linguistic structures;
- whether the timestamps associated with matching linguistic structures indicate that the linguistic structures are more recent than a configurable time parameter;
- whether certain linguistic structures are clustered together or are more similar to each other than to other linguistic structures in the set determined by the query result analyzer.

Based on business rules 205, relevance selector module 203 assigns scores to the gathered linguistic structures and selects those linguistic structures 400 that are most relevant to topic terms 7.

Automatic Content Creation Based on Linguistic Structures

According to the techniques described herein, a content creation process takes as input a set of linguistic structures that are determined by a linguistic discovery process as being relevant to one or more target topic terms. Based on the set of linguistic structures, the content creation process creates and/or synthesizes new content to meet an information need of web searchers. In some embodiments, the output of the content creation process may be a finished, formatted content product such as a web page, and in other embodiments the content creation process may also produce intermediate content products and data such as XML-formatted records or database records.

Figure 3A:
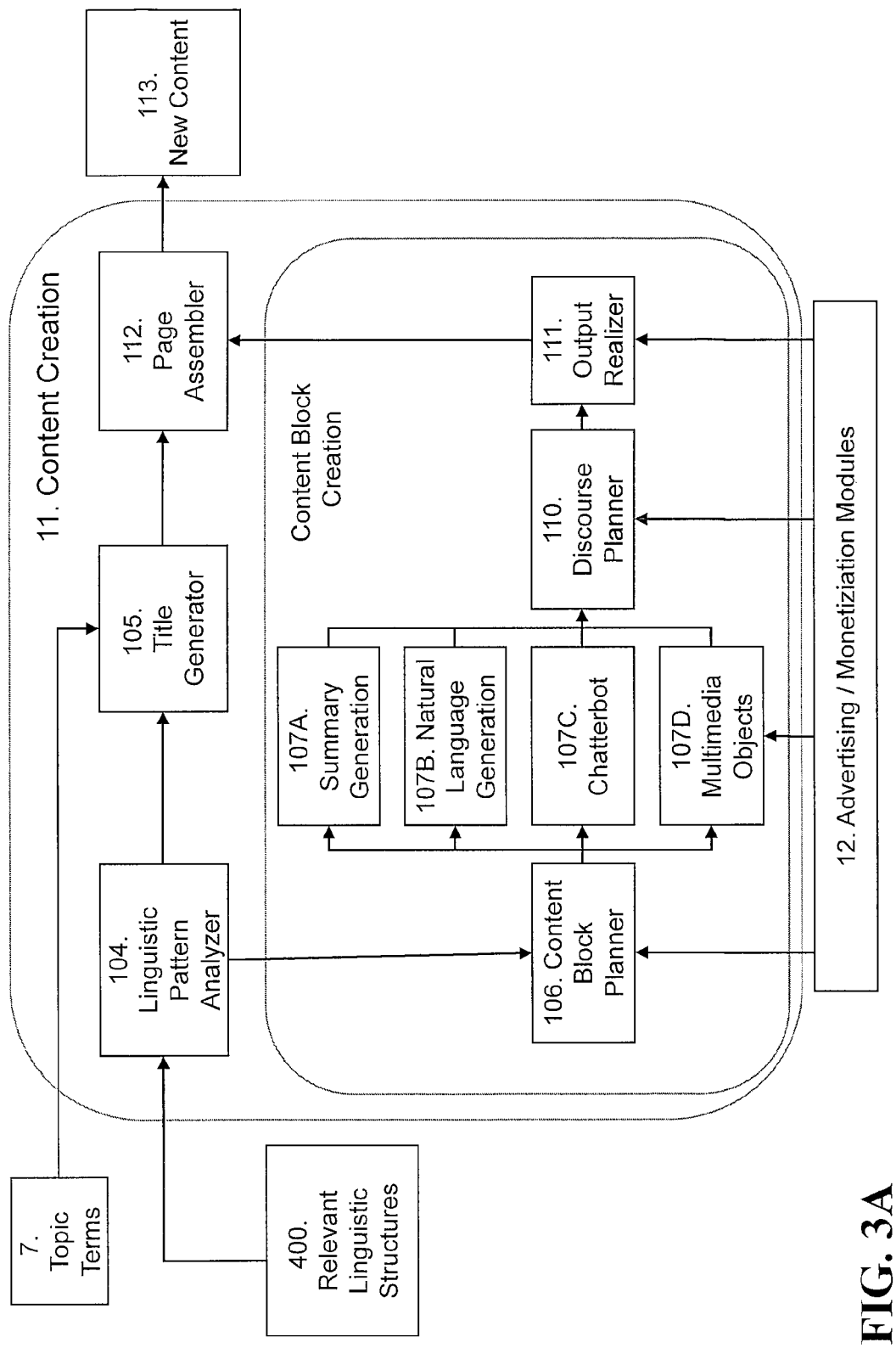
FIG. 3A illustrates an example content creation according to one embodiment.

FIG. 3A illustrates content creation according to an example embodiment. Content creation module 11 is logic configured to take as input one or more target topic terms 7 and a set of linguistic structures 400 that are relevant to the one or more target topic terms, and to produce as output data the new content 113. Content creation module includes linguistic pattern analyzer 104, title generator 105, content block planner 106, one or more content transformation modules (e.g., such as modules 107A-107D) configured to create content of various types, discourse planner 110, output realizer 111, and page assembler 112.

Linguistic pattern analyzer 104 is logic configured to process and classify the set of linguistic structures 400 into subsets that are associated with different types of content, and to determine for which types of content to create content items. For example, depending on the particular type of content that could be generated (e.g., text generation, discourse generation, conversation generation, etc.), linguistic pattern analyzer 104 may search the set of linguistic structures 400 for particular tags (e.g., such as particular part-of-speech identifiers, entity category identifiers, normalization values, phrasal category identifiers, semantic role identifiers) and may group those of the linguistic structures 400 that have corresponding tags. Further, when classifying the set of linguistic structures 400 into subsets, linguistic pattern analyzer 400 may use additional metadata information associated with the linguistic structures such as, for example, relationship identifiers that associate the linguistic structures with one another and annotations that indicate various information about the sources from which the data elements in the linguistic structures were extracted. For example, linguistic pattern analyzer 104 may examine linguistic structures 400 using statistical classification models, heuristic rules, business rules, etc. to determine whether one or more content blocks, each having content items of a particular content type, should be automatically created to meet the information need expressed in the target topic terms. In response to determining that one or more particular types of content blocks should be created, linguistic pattern analyzer 104 sends the appropriate subsets of linguistic structures 400 to content block planner 106. Content block planner 106 is logic configured to route the subsets of linguistic structures 400 to the appropriate content transformation modules (such as modules 107A-107D) each of which is dedicated to producing content of a specific content type.

For example, linguistic pattern analyzer 104 may identify the presence of a "person" entity within the set of linguistic structures 400 based, for example, on entity category identifiers and/or semantic role identifiers that are stored in the linguistic structures. Linguistic pattern analyzer 104 may then identify a subset of linguistic structures 400 and may direct content block planner 106 to facilitate the creation of one or more content blocks that include content items in the form of biographic information (expressed as one or more paragraphs in a natural language) and related links for the person indicated by the subset of linguistic structures. In another example, linguistic pattern analyzer 104 may determine that a set of relationships exists among a subset of linguistic structures 400. Linguistic pattern analyzer 104 may then direct content block planner 106 to facilitate the creation of one or more content blocks that combine in a mashup the data elements included in the subset of linguistic structures.

Other examples of content blocks that may be automatically created include, without limitation:
- a list of snippets and associated references (URLs) relevant to the target topic terms;
- a map showing locations icons and contextual information relevant to the target topic terms;
- a trend graph showing a time line and contextual information relevant to the target topic terms;
- a natural language sentence, paragraph, or article relevant to the target topic terms;
- a table of structured information relevant to the target topic terms;
- lists of links to other topics terms on different web pages that are relevant to the target topic terms;
- a visualization such as a word cloud, concept map, or diagram relevant to the target topic terms;
- a multimedia object such as, for example, an image, a sound clip, and/or a video clip, that is relevant to the target topic terms;
- categorized, labeled, and branded content blocks that group data elements from linguistic structures according to interests, such as for example:
  - Did you know that . . . ;
  - Some people say . . . ;
  - But other people think . . . ;
  - Latest buzz . . . ;
  - What's happening around here . . . ;
  - Historical interest . . . ;
  - Future events . . . ;
  - Things politicians said in the last 24 hours . . . ;
  - What happened in the San Francisco real estate market today . . . .

In some embodiments, the linguistic pattern analyzer may add additional expanded topics to a topic database that stores various topic terms and/or expected revenue information associated therewith, or may provide information that may be used to enhance the statistical modeling of demand prediction and forecasting for various topics. For example, the linguistic pattern analyzer may report any co-occurrences of target topic terms with new concepts and entities in a time-series format to a future demand prediction module, which can use the times series data for future demand prediction.

Referring to FIG. 3A, some of the output from linguistic pattern analyzer 104 (e.g., such as the target topic terms, the set of relevant linguistic structures 400, and/or other business logic) is sent to title generator 105. Title generator 105 is logic configured to produce a human readable, formatted, natural language title that is suitable for display to a human user.

The natural language title(s) generated by title generator 105 and the generated content blocks are sent to page assembler 112. Page assembler 112 is logic configured to combine the natural language titles and the generated content blocks into new content 113. New content 113 is a set of data that includes the generated content blocks and that may be formatted or structured according to a particular format. For example, page assembler 112 may automatically generate new content 113 in the form of markup language document(s) that comprise a web page or in the form of output data in a format that is suitable for rendering in particular target medium such as, for example, a mobile application and/or a web service that supports mobile application(s), a social media website, a social network feed, a content management system, etc. In some embodiments, the page assembler may use rules and heuristics to format the generated web page into a format that is suitable for search engine optimization. In addition, the page assembler may be configured to create multiple versions of the same web page for different target devices such as, for example, desktop or laptop computers, mobile phones, and other electronic devices that can execute web browsers to access the Internet.

In some embodiments, content block planner 106 and/or other modules in content creation module 11 may be configured to receive revenue information from one or more monetization modules 12. Content block planner 106 and/or the other modules in content creation module 11 may use the revenue information in deciding what types of content should be generated and how to organize the generated content in order to increase the expected advertising revenue.

Content Block Creation

According to the techniques described herein, content transformation modules, which are each configured to generate content of a specific type, are used to perform the process of creating content blocks. Each specific content transformation module is configured to process and convert the information stored in one or more linguistic structures into one or more content blocks that include content items having a specific content type.

For example, as illustrated in FIG. 3A, summary generation module 107A is logic configured to generate content blocks that combine data elements from a subset of linguistic structures 400 that is selected by linguistic pattern analyzer 104. Natural language generation module 107B is logic configured to generate natural language text from the information stored in a subset of linguistic structures 400. Chatterbot 107C is logic configured to generate, from a subset of linguistic structures 400, text statements that are usable in online conversations such as, questions, answers, and other types of sentences. Multimedia objects module 107D is logic configured to generate, from a subset of linguistic structures 400, multimedia objects such as images, audio clips, and video objects. It is noted that depending on the target medium for which content is generated, different embodiments may provide modules configured to generate various other types of content blocks.

To facilitate the creation of content blocks having particular content types, content block planner 106 analyzes the subsets of the linguistic structures 400 that it receives from linguistic pattern analyzer 104. Such analysis may include, for example, inspecting the linguistic category identifiers that are stored along with the data elements in the linguistic structures, and selecting or determining how to use the data elements depending on their corresponding linguistic category identifiers. Based on the analysis, content block planner 106 determines how to use the subsets of the linguistic structures as appropriate for the particular type of content blocks that need to be generated from each particular subset. For example, content block planner 106 may execute a business-rule guided logic to transform a particular subset of linguistic structures 400 into a form and/or format that can be used by a content transformation module to generate content blocks of a particular content type.

In an example operational scenario, in order to facilitate the generation of a content block that includes a map, content block planner 106 may select, based on entity category identifiers and/or normalization values, linguistic structures that contain geo spatial latitude/longitude coordinates, group the selected linguistic structures according to geographic area, and discard those linguistic structures without geospatial coordinates. Content block planner 106 may then send the selected linguistic structures along with processing instructions to a content transformation module that is configured to generate a map that displays information indicated by the data elements included in the selected linguistic structures.

Discourse planner 110 is logic configured to assemble and group the outputs from the various content transformation modules into a coherent understandable output. The discourse planning performed by discourse planner 110 may include classifying and grouping output content items (questions vs. answers, facts vs. opinions, etc.), choosing which content items to display or ignore, choosing to combine or split content items, or choosing the order of output content items.

For example, in some embodiments the discourse planner may be configured to use temporal cues to time-order information, or to utilize cues from Rhetorical Structure Theory to order information into a logical ordering such as:

1. "Some think that _____"; 2. "On the other hand _____"
1. "It has been reported that _____"; 2. "Therefore _____"
1. "This product can be used to _____"; 2. "You can find the product at _____"
1. "Question: Where can I _____?"; 2: "Answer: You can _____ at _____"

In some embodiments, the discourse planner may be configured to structure the logical order of sentences in a paragraph and/or the order of paragraphs in a content block or a set of content blocks. For example, the discourse planner may organize the logical order of the sentences in a given paragraph as follows:

1) Lead-in sentence: "Product X has high ratings."
2) Elaboration sentence: "Many people like feature A."
3) Contrasting sentence: "However, some prefer product Y."
4) Conclusion sentence: "Therefore, we recommend Product X."

In some embodiments, the discourse planner may be configured to structure a conversation or dialog between a questioner and an answerer, a blogger and commentators, opposite sides of a debate, etc.

Output realizer 111 is logic configured to convert the information stored in a set of linguistic structures into a finished, properly formatted content object such as a paragraph, a summary, a map, a video object, etc.

Creation of New Unique Articles

According to the techniques described herein, a natural language generator (e.g., such as natural language generation module 107B in FIG. 3A) may be configured to transform linguistic structures into new unique sentences that may paraphrase or summarize the data elements and other information stored in the original linguistic structures.

According to the techniques described herein, the natural language generator may be configured to create new articles by using a hybrid approach based on several approaches in statistical Natural Language Processing (NLP) including summarization, machine translation, and Natural Language Generation (NLG). For example:

- summarization approaches can be used according to the techniques described herein to transform information into more compact and succinct representations such as extracts and abstracts;
- machine translation (MT) approaches are typically used to transform information from one type of representation to another, typically from one natural language to another; however, mono-lingual machine translation (e.g., such as English to English) can be used according to the techniques described herein for automatic paraphrasing and transforming between different communications styles within a single natural language;
- Natural Language Generation (NLG) can be used according to the techniques described herein to transform unstructured, structured, or multimedia information into new text or speech.

Creation of New Unique Dialogs, Discourses and Conversations

A chatterbot is a computer program or logic configured to simulate, via auditory or textual methods, an intelligent discourse or conversation involving one or more human persons. According to the techniques described herein, a discourse, conversation, or other type of dialog can be constructed by combining unique statements or sentences emitted by a chatterbot (e.g., such as chatterbot 107C in FIG. 3A) together with statements created from a natural language generator (e.g., such as natural language generation module 107B in FIG. 3A).

For example, to construct a Question-and-Answer dialog, the natural language generator may use a set of linguistic structures (e.g., the data elements and/or other information stored therein) to produce a set of facts about a product, and then the chatterbot may read the set of facts and create a set of questions that are answered by those facts. A discourse planner module (e.g., such as discourse planner 110 in FIG. 3A) can select and order a set of questions and answers to produce a Frequently Asked Questions (FAQ) content block.

In another example, the natural language generator may use a set of linguistic structures (e.g., the data elements and/or other information stored therein) to generate and assemble new sentences to form a new blog post. One or more chatterbots can then create questions, comments, and opinions about the blog post that serve as comments. The discourse planner module can then order the generated content into a discourse in the form of a blog post followed by user comments.

In another example, the natural language generator may use a set of linguistic structures (e.g., the data elements and/or other information stored therein) to generate and assemble factual sentences that form the basis of an article. A chatterbot can then be trained to key off of different types of statements produced by the natural language generator to provide opinions and commentary about the article. The discourse planner module can then elect and order a combination of facts and commentary to create an editorial type article followed by a simulated human conversation. For example, the discourse planner module may organize the following conversation:

NLG output: "It has been reported that _____"
Chatterbot output: "I can't believe that has just happened."
NLG output: "Officials claim that _____"
Chatterbot output: "It makes me sad to think about it."

Creation of New Unique Videos

According to the techniques described herein, a multimedia objects module (e.g., such as multimedia objects module 107D in FIG. 3A) may be configured to automatically create a video from an automatically generated dialog by identifying one or more characters involved in the conversation. Further, the multimedia objects module may also be configured to automatically render and juxtapose in the video scene additional graphics, maps, title screens, etc. A discourse planner module can then select camera angles, pace of conversation, and integration of supporting graphics into the video scene. The discourse planner module then generates output in the form of a script that contains scene instructions and a dialog between the characters. An animation rendering agent (e.g., such as logic or module in output realizer 111 in FIG. 3A) can then use text-to-speech and artificial intelligence to simulate character behavior and to automatically render the script as a full motion video.

Automatic Generation of Natural Language Titles

The techniques described herein provide for automatically generating natural language titles for content that is itself autonomously and automatically generated. In some embodiments, the title generation process takes as input the target topic terms and generates or otherwise synthesizes a title in the form of natural language text by performing operations that include, but are not limited to, collecting additional information, analyzing relevant linguistic structures and applying corpus statistics thereto, determining what other words and phrases besides the target topic terms should appear in the title and in what order, and inserting additional words and characters to make the generated title more readable (e.g., like adding modifiers, verbs, adjectives, prepositions, punctuation, etc.).

Automatically generating a good (e.g., such as informative and compelling) natural language title for automatically generated content has several benefits. For example, one benefit is that a web page on which the title appears would be better crawled and indexed by a web search engine, which in turn would lead to the web page being ranked higher in search results returned by the search engine. Another benefit is that an automatically generated web page having a good natural language title entices web users to click on a link to the content that is provided in search engine results, which in turn can drive up the traffic to the web page and thus lead to increased advertising revenue. In addition, the autonomous and automatic title generation process described herein allows for generating natural language titles in such manner that the generated titles are related more closely to the target topic terms than titles that would normally be made up by human users, which allows for the generated titles to be more responsive to long-tail queries that include the topic terms.

Figure 3B:
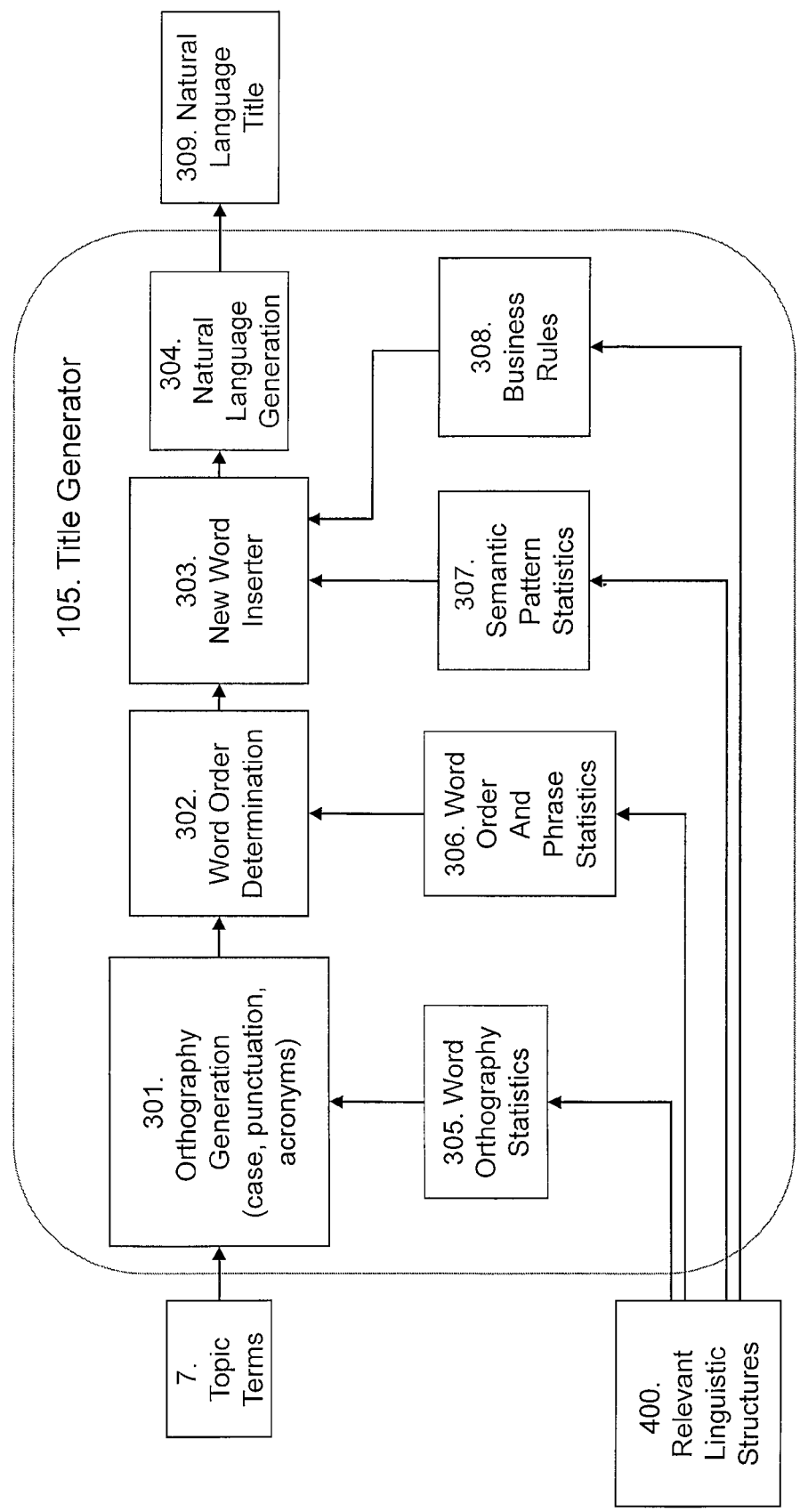
FIG. 3B illustrates an example title generation according to one embodiment.

FIG. 3B illustrates title generation according to an example embodiment. In the embodiment illustrated in FIG. 3B, title generator 105 includes orthography generation module 301, word order determination module 302, new word inserter 303, and natural language generation module 304. Title generator 105 takes as input the one or more target topic terms 7 and the set of relevant linguistic structures 400, and automatically generates natural language title 309 that is more readable to human persons.

Orthography generation module 301 is logic configured to receive the target topic terms 7 and to determine the appropriate case and additional punctuation. Orthography generation module 301 performs this functionality by using word orthography statistics 305 (which are corpus statistics performed on the set of relevant linguistic structures 400 that include the topic terms in question) and by statistically analyzing the most likely combination of upper and lower case letters. Based on the determination, orthography generation module 301 modifies the target topic terms 7 to reflect the appropriate letter case. Some examples of the input and output of orthography generation module 301 may be as follows:

"us postal service"→"US Postal Service";
"ipod touch 8 gb"→"iPod Touch 8 GB".

In addition, orthography generation module 301 may also use word orthography statistics 305 to determine certain punctuation that tends to appear with certain terms. For example, orthography generation module 301 may change punctuation in a set of topic terms as follows:

"mr john q public"→"Mr. John Q. Public".

Word order determination module 302 is logic configured to analyze the target topic terms 7 and to determine the optimal word ordering. Word order determination module 302 performs this functionality by using word order and phrase statistics 306 (which are corpus statistics performed on the set of relevant linguistic structures 400 that include all of the target topic terms) and by statistically analyzing the most likely combination of phrases and word ordering. For example, given the set of topic terms "hotels london cheap", word order determination module 302 may build a corpus statistics model that provides:

the probability that a topic term "X" appears first, $P_{first}(X)$, in the set of relevant linguistic structures; and the conditional probability that a topic term "Y" appears after a topic term "X", $P_{next}(X, Y)$, in the set of relevant linguistic structures.

Based on this model, word order determination module 302 may determine that $Max(P_{first}(X))$ reveals that "cheap" (e.g., X="cheap") is the most likely word to appear as the first word in a statement. Then if "cheap" is chosen as the first word, then word order determination module 302 determines that $Max(P_{next}("cheap", Y)$ reveals that "hotels" (e.g., Y="hotels") is most likely to appear as the next word. Thus, word order determination module 302 determines that the set of topic terms "hotels london cheap"

should be rewritten into the more readable order

"cheap hotels london".

New word inserter 303 is logic configured to analyze the target topic terms 7 and to determine whether and what additional words or characters need to be inserted into the generated title 309. New word inserter 303 performs this functionality by using semantic pattern statistics 307 (which are corpus statistics performed on the set of relevant linguistic structures 400) and by statistically analyzing the most likely modifiers, verbs, adjectives, and prepositions to insert into the generated title 309. Some examples of the input and output of new word inserter 303 may be as follows:

"Cheap Hotels London"→"Cheap Hotels in London";
"Cheap Hotels In"→"Cheap Hotels in . . . ";
"Flights Atlanta Paris"→"Flights From Atlanta To Paris".

In addition, based on semantic patterns and roles derived from semantic pattern statistics 307, new word inserter 303 may use business rules 308 in conjunction with natural language generation module 304 in order to programmatically insert certain words into the generated title 309. Some examples of the input and output of new word inserter 303 based on semantic patterns may be as follows:

Predicate=<Verb>, Object=<Product>→"How to <Verb> a <Product>";
Predicate=<Verb>, Object=<Facility>, Locational=<Location>→"Where to <Verb> a <Facility> in <Location>".

In some embodiments, information from data sources 603 may be added to, or used to modify, business rules 308 to insert certain words into the generated title 309, for example to make the generated title more timely based on current search trends.

Example Output Web Page

Figure 5:
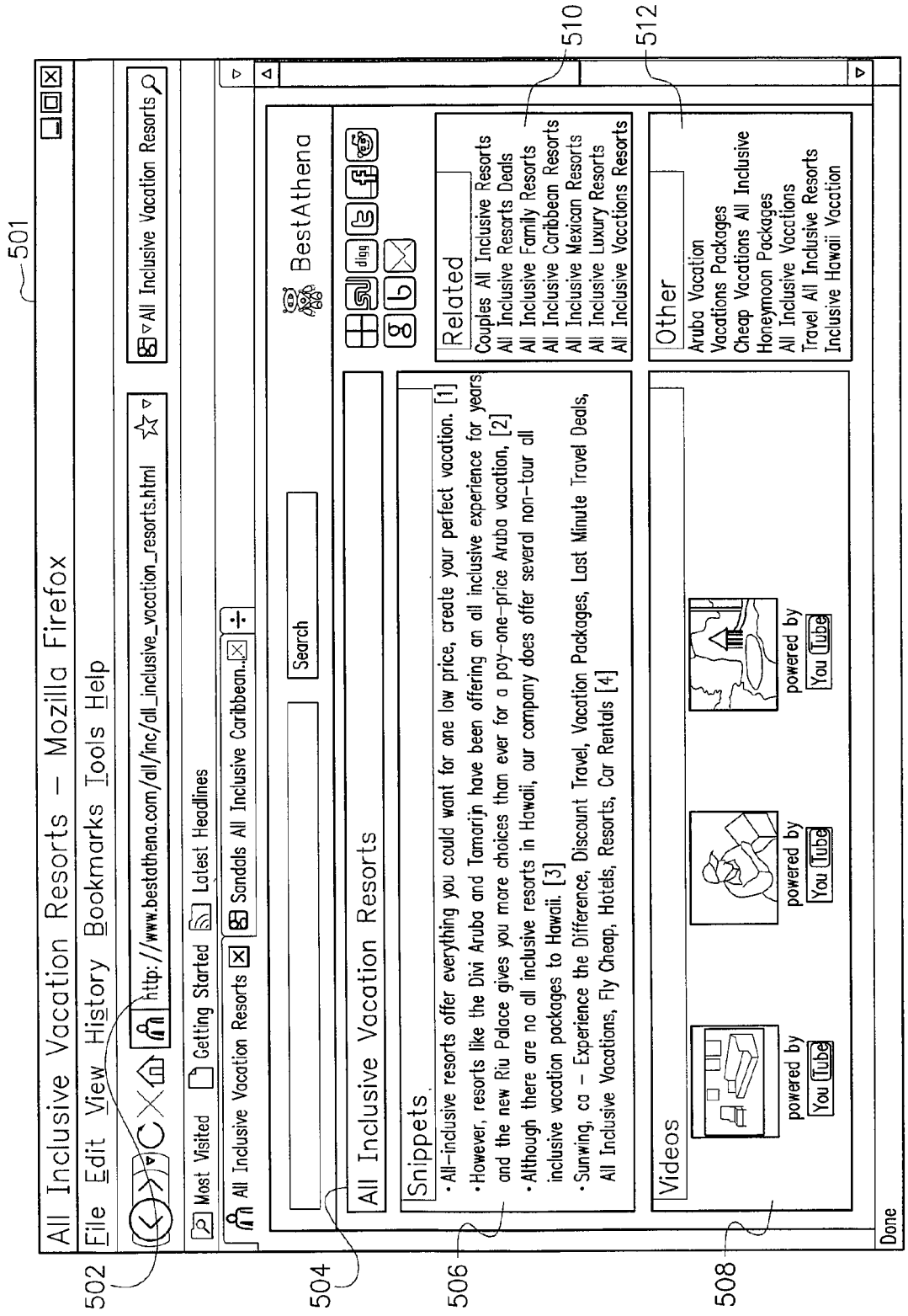
FIG. 5 illustrates an example output web page according to one embodiment.

FIG. 5 illustrates an example output web page according to one embodiment. For illustration purposes, output web page 502 is shown as rendered in web browser 501; it is noted, however, that the one or more markup language documents and other files (e.g., such as images, graphics, etc.) that comprise web page 502 are hosted on a web server.

Web page 502 is autonomously and automatically generated according to the techniques described herein. For example, the set of target topic terms "all inclusive vacation resorts"

is automatically determined by analyzing data retrieved from various data sources. Then, a set of information that is related to the target topic terms is automatically acquired. Linguistic analysis on the acquired set of information is automatically performed to determine a set of linguistic structures that are represented in the set of information. The set of linguistic structures is then used to automatically create the content items in content blocks 506-512 and the natural language title 504. Web page 502 is then automatically generated to include natural language title 504 and content blocks 506-512. Web page 502 is then published in the ".com" online domain on a web site located at URL "http://www.bestathena.com" that is hosted on a web server.

As illustrated in FIG. 5, natural language title 504 includes all of the target topic terms, where the proper letter case has been automatically added. Content block 506 includes several content items that are natural language sentences and that are organized in two sections titled "Snippets" and "References". Content block 508 includes several content items organized in a section titled "Videos", where the content items are links to YouTube videos that promote specific all inclusive vacation resorts. Content block 510 includes several content items that are natural language sentences tagged as "href" links that point to other automatically generated web pages with content that is similar or closely related to the target topic terms—e.g., such as content related to all inclusive vacation resorts at specific locations. Content block 512 includes several content items that are natural language sentences tagged as "href" links that point to other automatically generated web pages with content that is somewhat loosely related to the target topic terms—e.g., such as content related to vacation packages and all inclusive family vacations.

Example Operational Context

Figure 6:
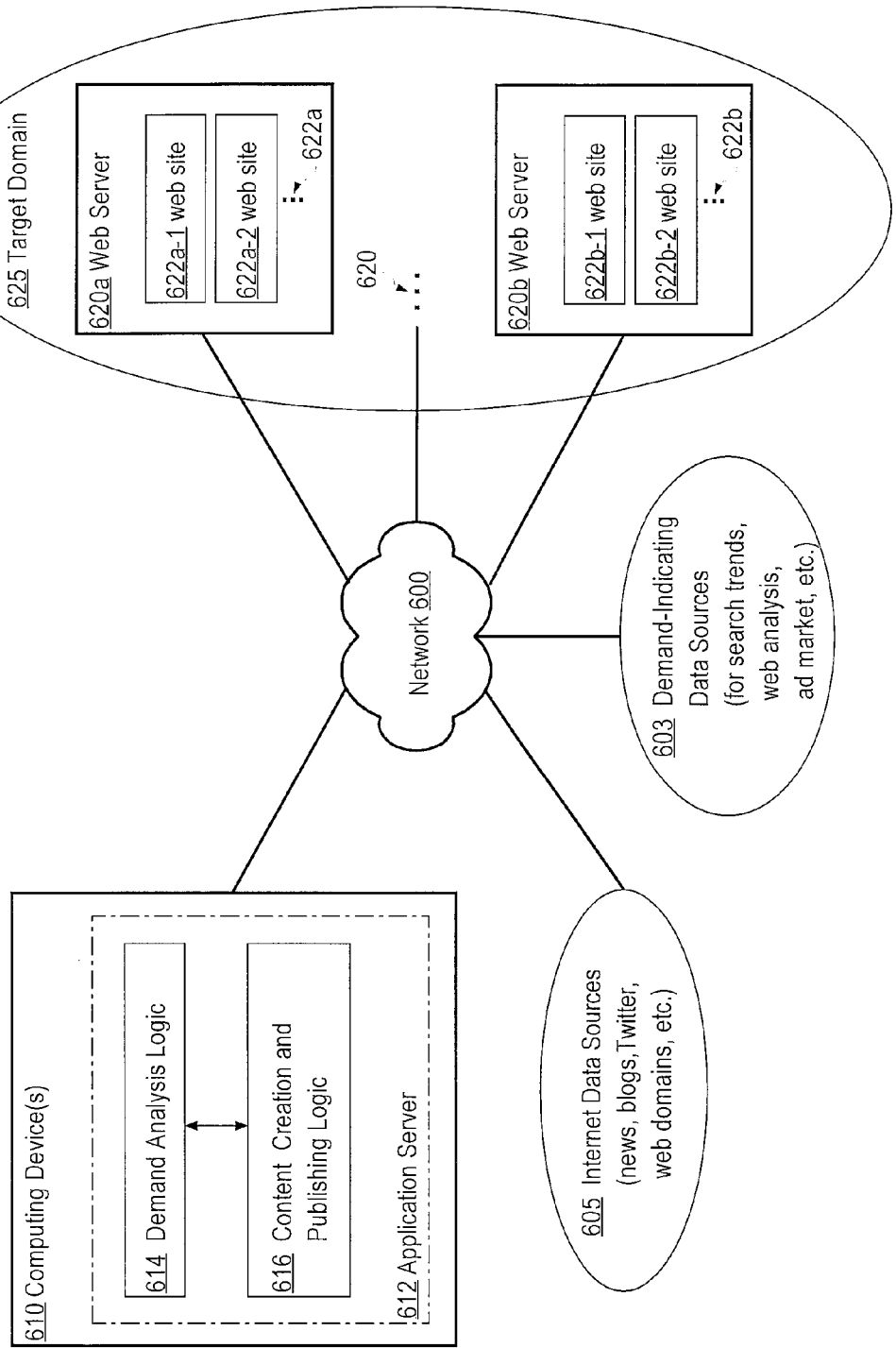
FIG. 6 illustrates an example operational context according to one embodiment.

FIG. 6 illustrates an example operational context according to one embodiment. Computing device(s) 610 are communicatively connected through network 600 to data sources 603 and 605 and to web servers 620 that host web sites in target online domain 625. For illustration purposes only, data sources 603 and 605 are shown in FIG. 6 as being separate from target domain 625; however, in various embodiments and operational contexts, some or all of data sources 603 and 605 may be hosted on servers within the target domain 625.

As used herein, "server" refers to one or more software components which, when executed by one or more computing devices, may be allocated computational resources, such as memory, CPU time, and/or disk storage space in order to perform one or more functionalities. As used herein, "web server" refers to a server that is configured to perform various functionalities of delivering web content to clients (e.g., such as web browsers) over a web protocol (e.g., such as the Hypertext Transfer Protocol (HTTP)). As used herein, "online domain" refers to a group of servers that are identified by domain names having the same suffix; examples of online domains include, but are not limited to, public Internet domains such as the ".com", ".org", ".net", ".gov" domains, intranet domains that are established in private networks, and any other types of domains that organize groups of servers and computers that are accessible over one or more networks.

According to the techniques described herein, computing device(s) 610 include demand analysis logic 614 and content creation and publishing logic 616. As illustrated in FIG. 6, demand analysis logic 614 and content creation and publishing logic 616 are included as part of application server 612 that is configured to perform the techniques described herein for autonomous and automatic real-time publishing of web content. It is noted that application server 612 may include additional modules or other logic such as user interface logic for receiving configuration information, database access logic for accessing one or more database servers, and various other types of logic that may depend on the particular implementation and/or operational context. It is also noted that the techniques described herein are not limited to being performed only by an application server, but can rather also be performed by various other types of servers, services, and other computer process entities.

According to the techniques described herein, demand analysis logic 614 is configured to monitor disparate data sources 603 to find search topics that are undersupplied with content in one or more online domains such as, for example, target domain 625. Based on automatic and autonomous analysis of information retrieved from the disparate data sources, demand analysis logic 614 is configured to generate target topic terms for which web content is to be automatically created and published by content creation and publishing logic 616.

Content creation and publishing logic 616 is configured to automatically create and publish content in accordance with the techniques described herein. For example, content creation and publishing logic 616 and/or a component thereof is configured to receive as input target topic terms from demand analysis logic 614, and to create as output new unique content that is responsive to searches that include the target topic terms. During the process of content creation, content creation and publishing logic 616 (and/or components or modules thereof) may be configured to perform the various functionalities of the techniques described herein such as, for example, automatically acquiring a set of information that is related to the target topic terms from internet data sources 605, automatically performing linguistic analysis on the retrieved set of information and automatically generating a set of linguistic structures, and using the set of linguistic structures to automatically create new content.

Content creation and publishing logic 616 is further configured to output and publish the new content as a finished, formatted content product such as a web page; in addition, in some embodiments the content creation and publishing logic may also produce and store intermediate content products such as XML-formatted records or database records. After generating the new content, content creation and publishing logic 616 is configured to publish the generated new content in target domain 625.

Target domain 625 includes one or more web servers 620 such as, for example, web servers 620a and 620b. Web server 620a hosts one or more web sites 622a such as, for example, web sites 622a-1 and 622a-2. Similarly, web server 620b hosts one or more web sites 622b such as, for example, web sites 622b-1 and 622b-2.

According to the techniques described herein, after new content responsive to the target topic terms is generated, content creation and publishing logic 616 publishes the new content in one or more web sites. For example, after automatically generating a web page with new content, content creation and publishing logic 616 may automatically login on web server 620a and may store the generated web page as part of web site 622a-1; similarly, content creation and publishing logic 616 may automatically login on web server 620b and may store the generated web page as part of web site 622b-2. By doing so, content creation and publishing logic 616 effectively makes the generated web page available for crawling and indexing by various search engines (not shown in FIG. 6).

After the generated web page is published in this manner in the target domain 625, web crawlers will crawl and index the generated web page, and thus the web page will be listed in search results produced by various search engines. Over time, the search engines will optimize its indexing and the generated web page will get higher in the rankings made by the search engines. Then, when a user submits to a search engine a long-tail query with the target topic terms, the user is likely to find the generated web site very near the top of the rankings that are returned (e.g., top 10 results) by the search engine in the search results.

Hardware Overview

According to an example embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, network infrastructure devices or any other device that incorporates hard-wired and/or program logic to implement the techniques.

Figure 7:
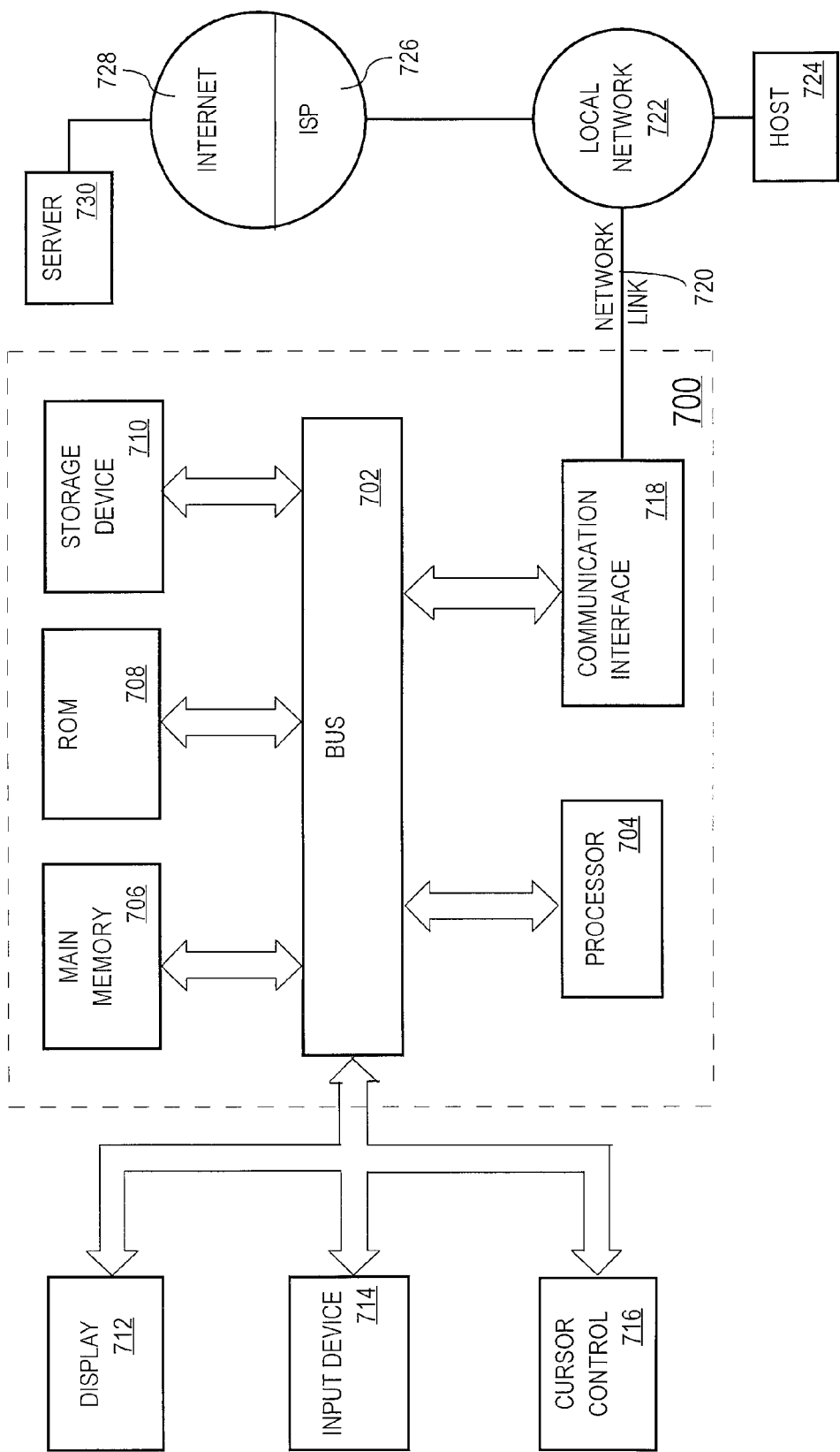
FIG. 7 illustrates an example computing device on which embodiments may be implemented.

For example, FIG. 7 illustrates a computer system 700 upon which an embodiment of the techniques described herein may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or a liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques described herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   obtaining one or more topic terms;
   automatically acquiring a set of information that is related to the one or more topic terms;
   automatically performing linguistic analysis on the set of information to determine a set of linguistic structures that are represented in the set of information wherein each linguistic structure in the set of linguistic structures includes a data element and one or more identifiers that respectively identify one or more linguistic categories which are associated with the data element:
   automatically determining a set of relevant linguistic structures that are represented in the set of information by at least:
      automatically generating one or more semantic queries based on a semantic query template and the one or more topic terms,
      automatically executing the one or more semantic queries on the set of linguistic structures based on, for each linguistic structure in the set of linguistic structures, how relevant the linguistic structure is to the one or more topic terms;
   automatically classifying the set of relevant linguistic structures based on the one or more identifiers included in each linguistic structure of the set of relevant linguistic structures to create a subset of selected linguistic structures;
   automatically using the subset of selected linguistic structures to create a set of content items that are responsive to searches that include the one or more topic terms based on the data element included in each linguistic structure of the subset of selected linguistic structures;
   automatically creating new content by transforming the set of content items into one or more markup language documents representing one or more new web pages;
   automatically publishing the one or more new web pages to one or more online domains by storing the one or more markup language documents on one or more web servers configured in the one or more online domains;
   wherein the method is performed by one or more computing devices.

2. The method of claim 1, further comprising, prior to acquiring the set of information, automatically determining that content responsive to the one or more topic terms is undersupplied in the one or more online domains.

3. The method of claim 1, wherein automatically acquiring the set of information comprises:
   determining a set of semantic queries based on the one or more topic terms;
   executing the set of semantic queries and retrieving results responsive to the set of semantic queries;

analyzing the results to determine an expanded set of topic terms that are related to the one or more topic terms;

using the expanded set of topic terms to search for and retrieve the set of information that is related to the one or more topic terms.

4. The method of claim 3, wherein automatically acquiring the set of information further comprises performing two or more iterations that include determining the set of semantic queries, executing the set of semantic queries, and analyzing the results responsive to the set of semantic queries, each iteration comprising using the expanded set of topic terms determined during a previous iteration to modify the set of semantic queries, executing the modified set of semantic queries to retrieve modified results, and analyzing the modified results to determine a modified expanded set of topic terms.

5. The method of claim 1, wherein the set of information comprises text items, and wherein automatically performing linguistic analysis comprises:

for each text item in the set of information:
parsing the text item into a set of words;
determining one or more part-of-speech linguistic structures for the set of words;
determining one or more phrasal linguistic structures based at least on the one or more part-of-speech linguistic structures;
determining one or more semantic-role linguistic structures based at least on the one or more phrasal linguistic structures;
storing, as part of the set of linguistic structures, one or more of the one or more part-of-speech linguistic structures, the one or more phrasal linguistic structures, and the one or more semantic-role linguistic structures.

6. The method of claim 5, wherein automatically performing linguistic analysis further comprises:

determining one or more entity linguistic structures based on the one or more part-of-speech linguistic structures, wherein the one or more entity linguistic structures include one or more identifiers of entity categories;
normalizing the one or more entity linguistic structures by determining and assigning, to at least one of the one or more entity linguistic structures, one or more normalization values;
storing, as part of the set of linguistic structures, one or more of the one or more entity linguistic structures and the one or more normalization values.

7. The method of claim 5, wherein:

the one or more part-of-speech linguistic structures include one or more identifiers of linguistic categories that include one or more of: a proper name category, a verb group category, a determiner category, a noun category, a prepositional category, and a data context category;
the one or more phrasal linguistic structures include one or more identifiers of linguistic categories that include one or more of: a noun phrase category, a verb phrase category, and a prepositional phrase category;
the one or more semantic-role linguistic structures include one or more identifiers of semantic roles that include one or more of: a subject role, a predicate role, an object role, a temporal role, and a location role.

8. The method of claim 1, further comprising:

based on the subset of selected linguistic structures, automatically creating one or more natural language titles for the one or more new web pages.

9. The method of claim 8, wherein automatically creating the one or more natural language titles further comprises:

based on the one or more topic terms and the subset of selected linguistic structures, determining one or more sets of words for the one or more natural language titles;
using the one or more topic terms and the subset of selected linguistic structures to determine letter case and punctuation for each of the one or more sets of words in the one or more natural language titles;
determining a word order for each of the one or more sets of words in the one or more natural language titles;
analyzing the one or more topic terms to determine whether additional words need to be inserted in the one or more sets of words in the one or more natural language titles, and generating one or more additional words in response to determining that additional words need to be inserted.

10. The method of claim 1, wherein classifying the set of relevant linguistic structures further comprises determining for which types of content of a plurality of different types of content, to create the set of content items.

11. The method of claim 1, wherein automatically creating the set of content items using the subset of selected linguistic structures comprises one or more of:

automatically creating first one or more content items that combine data elements from a first subset of linguistic structures;
automatically creating second one or more content items that include natural language text generated based on a second subset of linguistic structures;
based on a third subset of linguistic structures, automatically creating third one or more content items that include text statements usable in online conversations;
based on a fourth subset of linguistic structures, automatically creating fourth one or more content items that include multimedia objects.

12. The method of claim 1, wherein automatically publishing the new content comprises one or more of:

automatically generating the one or more new web pages by assembling the set of content items and one or more automatically-generated natural language titles into the one or more markup language documents that comprise the one or more new web pages, and publishing the one or more markup language documents online;
automatically generating output data that includes the set of content items and sending the output data to a web service that supports one or more mobile applications;
automatically generating the output data that includes the set of content items and sending the output data to one or more mobile devices;
automatically generating the output data that includes the set of content items and sending the output data to one or more social network feeds;
automatically generating the output data that includes the set of content items and sending the output data to one or more content management systems.

13. The method of claim 1, wherein automatically publishing the new content comprises:

automatically generating the one or more new web pages by assembling the set of content items and one or more automatically-generated natural language titles into one or more markup language documents that comprise the one or more new web pages.

14. A computer-readable storage medium comprising one or more sequences of instructions which, when executed by one or more processors, cause the one or more processors to perform:

obtaining one or more topic terms;

automatically acquiring a set of information that is related to the one or more topic terms;

automatically performing linguistic analysis on the set of information to determine a set of linguistic structures that are represented in the set of information wherein each linguistic structure in the set of linguistic structures includes a data element and one or more identifiers that respectively identify one or more linguistic categories which are associated with the data element;

automatically determining a set of relevant linguistic structures that are represented in the set of information by at least:

automatically generating one or more semantic queries based on a semantic query template and the one or more topic terms, automatically executing the one or more semantic queries on the set of linguistic structures based on, for each linguistic structure in the set of linguistic structures, how relevant the linguistic structure is to the one or more topic terms;

automatically classifying the set of relevant linguistic structures based on the one or more identifiers included in each linguistic structure of the set of relevant linguistic structures to create a subset of selected linguistic structures;

automatically using the subset of selected linguistic structures to create a set of content items that are responsive to searches that include the one or more topic terms based on the data element included in each linguistic structure of the subset of selected linguistic structures;

automatically creating new content by transforming the set of content items into one or more markup language documents representing one or more new web pages;

automatically publishing the one or more new web pages to one or more online domains by storing the one or more markup language documents on one or more web servers configured in the one or more online domains.

15. The computer-readable storage medium of claim 14, wherein the one or more sequences of instructions further comprise instructions which, when executed by the one or more processors, cause the one or more processors to perform, prior to acquiring the set of information, automatically determining that content responsive to the one or more topic terms is undersupplied in the one or more online domains.

16. The computer-readable storage medium of claim 14, wherein the instructions that cause automatically acquiring the set of information comprise instructions which, when executed by the one or more processors, cause the one or more processors to perform:

determining a set of semantic queries based on the one or more topic terms;

executing the set of semantic queries and retrieving results responsive to the set of semantic queries;

analyzing the results to determine an expanded set of topic terms that are related to the one or more topic terms;

using the expanded set of topic terms to search for and retrieve the set of information that is related to the one or more topic terms.

17. The computer-readable storage medium of claim 16, wherein the instructions that cause automatically acquiring the set of information further comprise instructions which, when executed by the one or more processors, cause performing two or more iterations that include determining the set of semantic queries, executing the set of semantic queries, and analyzing the results responsive to the set of semantic queries, each iteration comprising using the expanded set of topic terms determined during a previous iteration to modify the set of semantic queries, executing the modified set of semantic queries to retrieve modified results, and analyzing the modified results to determine a modified expanded set of topic terms.

18. The computer-readable storage medium of claim 14, wherein the set of information comprises text items, and wherein the instructions that cause automatically performing linguistic analysis comprise instructions which, when executed by the one or more processors, cause the one or more processors to perform:

for each text item in the set of information:

parsing the text item into a set of words;

determining one or more part-of-speech linguistic structures for the set of words;

determining one or more phrasal linguistic structures based at least on the one or more part-of-speech linguistic structures;

determining one or more semantic-role linguistic structures based at least on the one or more phrasal linguistic structures;

storing, as part of the set of linguistic structures, one or more of the one or more part-of-speech linguistic structures, the one or more phrasal linguistic structures, and the one or more semantic-role linguistic structures.

19. The computer-readable storage medium of claim 18, wherein the instructions that cause automatically performing linguistic analysis further comprise instructions which, when executed by the one or more processors, cause the one or more processors to perform:

determining one or more entity linguistic structures based on the one or more part-of-speech linguistic structures, wherein the one or more entity linguistic structures include one or more identifiers of entity categories;

normalizing the one or more entity linguistic structures by determining and assigning, to at least one of the one or more entity linguistic structures, one or more normalization values;

storing, as part of the set of linguistic structures, one or more of the one or more entity linguistic structures and the one or more normalization values.

20. The computer-readable storage medium of claim 18, wherein:

the one or more part-of-speech linguistic structures include one or more identifiers of linguistic categories that include one or more of: a proper name category, a verb group category, a determiner category, a noun category, a prepositional category, and a data context category;

the one or more phrasal linguistic structures include one or more identifiers of linguistic categories that include one or more of: a noun phrase category, a verb phrase category, and a prepositional phrase category;

the one or more semantic-role linguistic structures include one or more identifiers of semantic roles that include one or more of: a subject role, a predicate role, an object role, a temporal role, and a location role.

21. The computer-readable storage medium of claim 14, wherein the instructions further comprise instructions which, when executed by the one or more processors, cause:

based on the subset of selected linguistic structures, automatically creating one or more natural language titles for the one or more new web pages.

22. The computer-readable storage medium of claim 21, wherein the instructions that cause automatically creating the one or more natural language titles further comprise instructions which, when executed by the one or more processors, cause:

based on the one or more topic terms and the subset of selected linguistic structures, determining one or more sets of words for the one or more natural language titles;

using the one or more topic terms and the subset of selected linguistic structures to determine letter case and punctuation for each of the one or more sets of words in the one or more natural language titles;

determining a word order for each of the one or more sets of words in the one or more natural language titles;

analyzing the one or more topic terms to determine whether additional words need to be inserted in the one or more sets of words in the one or more natural language titles, and generating one or more additional words in response to determining that additional words need to be inserted.

23. The computer-readable storage medium of claim 14, wherein classifying the set of relevant linguistic structures further comprises determining for which types of content of a plurality of different types of content, to create the set of content items.

24. The computer-readable storage medium of claim 14, wherein the instructions that cause automatically creating the set of content items using the subset of selected linguistic structures further comprise instructions which, when executed by the one or more processors, cause one or more of:

automatically creating first one or more content items that combine data elements from a first subset of linguistic structures;

automatically creating second one or more content items that include natural language text generated based on a second subset of linguistic structures;

based on a third subset of linguistic structures, automatically creating third one or more content items that include text statements usable in online conversations;

based on a fourth subset of linguistic structures, automatically creating fourth one or more content items that include multimedia objects.

25. The computer-readable storage medium of claim 14, wherein the instructions that cause automatically publishing the new content comprise instructions which, when executed by the one or more processors, cause the one or more processors to perform one or more of:

automatically generating the one or more new web pages by assembling the set of content items and one or more automatically-generated natural language titles into the one or more markup language documents that comprise the one or more new web pages, and publishing the one or more markup language documents online;

automatically generating output data that includes the set of content items and sending the output data to a web service that supports one or more mobile applications;

automatically generating the output data that includes the set of content items and sending the output data to one or more mobile devices;

automatically generating the output data that includes the set of content items and sending the output data to one or more social network feeds;

automatically generating the output data that includes the set of content items and sending the output data to one or more content management systems.

26. The computer-readable storage medium of claim 14, wherein the instructions that cause automatically publishing the new content comprise instructions which, when executed by the one or more processors, cause the one or more processors to perform:

automatically generating one or more new web pages by assembling the set of content items and one or more automatically-generated natural language titles into one or more markup language documents that comprise the one or more new web pages.

\* \* \* \* \*

UNITED STATES PATENT AND TRADEMARK OFFICE
CERTIFICATE OF CORRECTION

PATENT NO. : 9,110,977 B1  
APPLICATION NO. : 13/020672  
DATED : August 18, 2015  
INVENTOR(S) : John M. Pierre et al.

Page 1 of 1

It is certified that error appears in the above-identified patent and that said Letters Patent is hereby corrected as shown below:

Title page, item (75), under Inventors, delete "John Hell Wig, Penn Valley, CA (US)", and insert -- John Hellwig, Penn Valley, CA (US) --.

Signed and Sealed this
Ninth Day of August, 2016

Michelle K. Lee
*Director of the United States Patent and Trademark Office*